Oct. 1, 1940.  T. H. O'BRIEN  2,216,321
ROPE REVERSING GEARING
Filed Nov. 18, 1938  3 Sheets-Sheet 1

INVENTOR
T. H. O'Brien

INVENTOR.
T. H. O'Brien.

Patented Oct. 1, 1940

2,216,321

UNITED STATES PATENT OFFICE 2,216,321

ROPE REVERSING GEARING

Terence Herriot O'Brien, Kendal, England, assignor to Isaac Braithwaite & Son Engineers Limited, Kendal, England Application November 18, 1938, Serial No. 241,168
In Great Britain December 15, 1937

2 Claims. (Cl. 74—220)

This invention relates to rope reversing gearing for driving machines where an automatic periodical reversal of the machine is required.

The gearing comprises a driving shaft and a driven shaft at right angles or approximately at right angles, a grooved rope driving pulley fast on the driving shaft, a loose idle pulley two pairs of fast and loose grooved rope pulleys on the driven shaft, an endless driving rope around the pulleys, mechanism to shift the rope periodically alternately from side to side from the fast to the loose pulley of one pair and from the loose to the fast pulley of the other pair thereby reversing the direction of rotation of the driven shaft.

The mechanism for shifting the rope comprises a reciprocating bar operated by a crank driven by a reducing gear from the driving shaft and a second bar carried on slides in a swivelling bracket mounted to oscillate about the driven shaft and operated by the reciprocating bar to which forks are attached for shifting the rope from one grooved rope pulley to the adjacent one.

The invention will be described with reference to the accompanying drawings in which—

Figure 1:
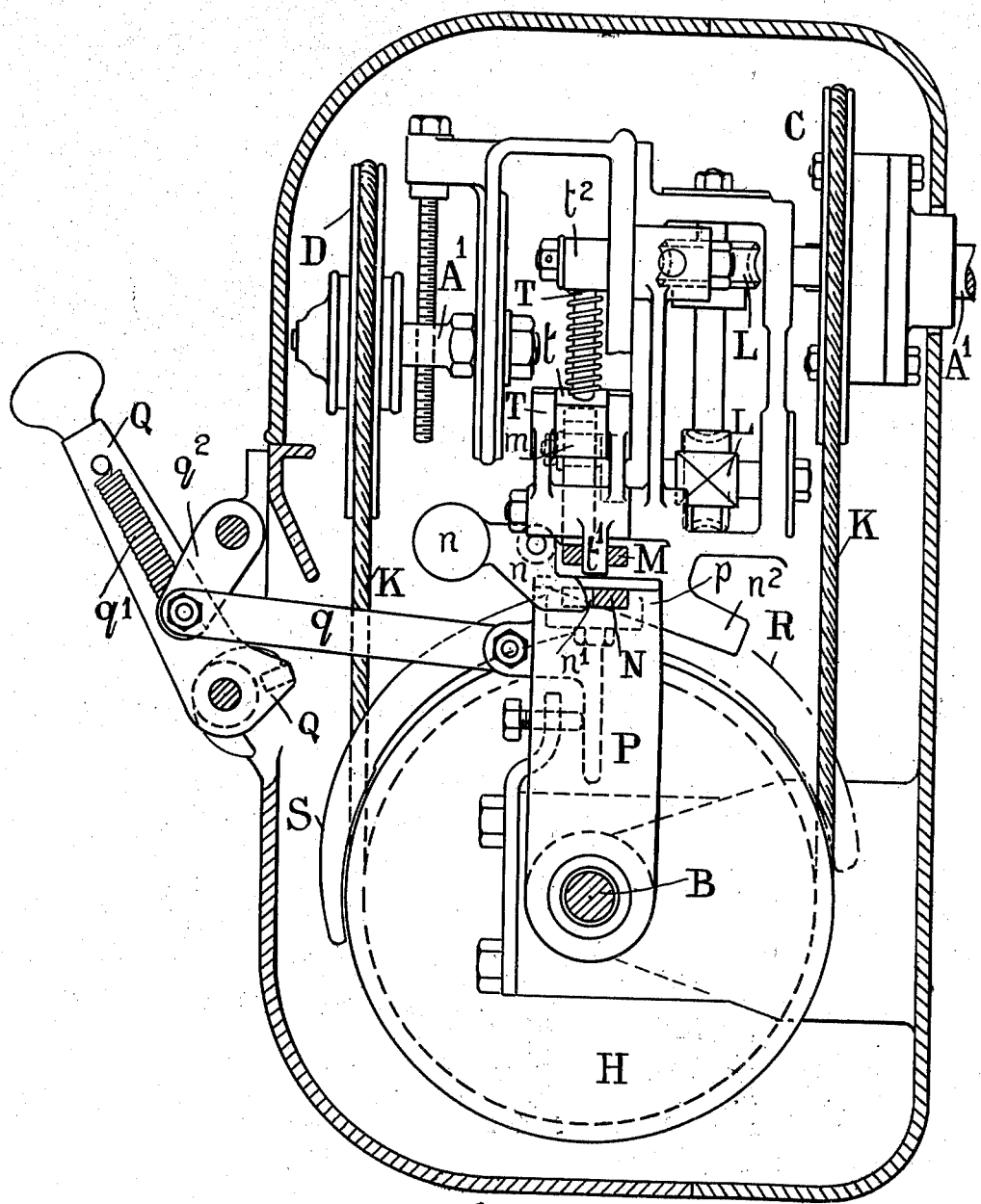
Fig. 1 is a side elevation.
Figure 2:
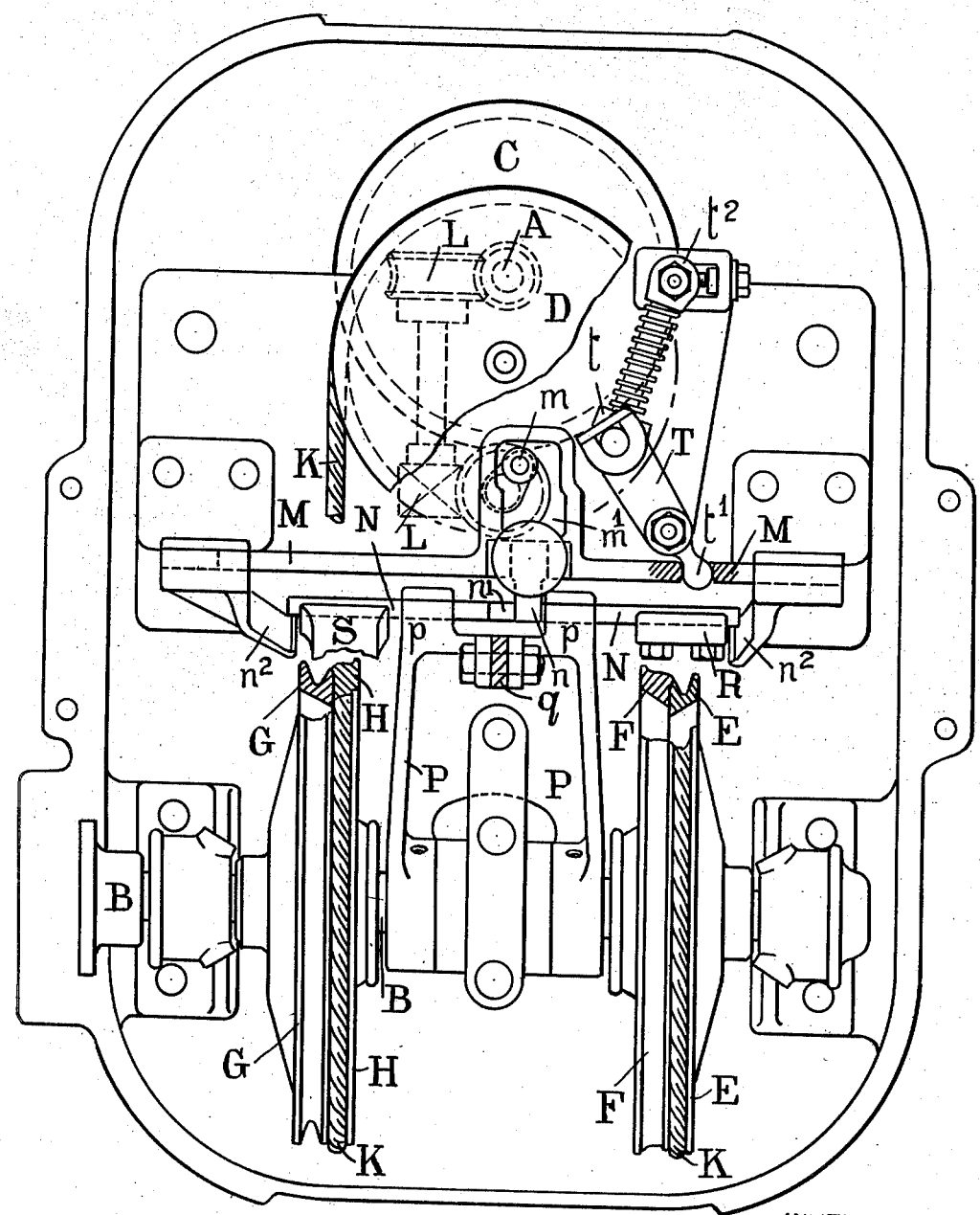
Fig. 2 is an elevation at right angles to Fig. 1.
Figure 4:
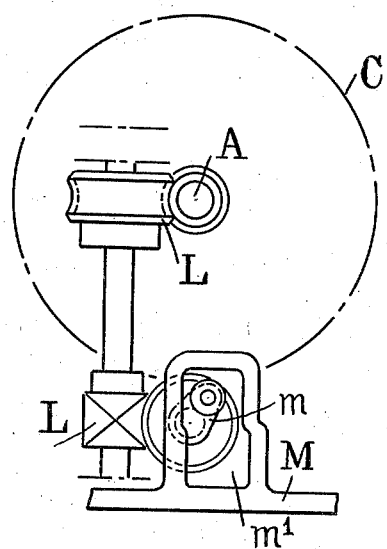
Figs. 3 and 4 show details of the reducing gear for driving the reciprocating bar.
Figure 3:
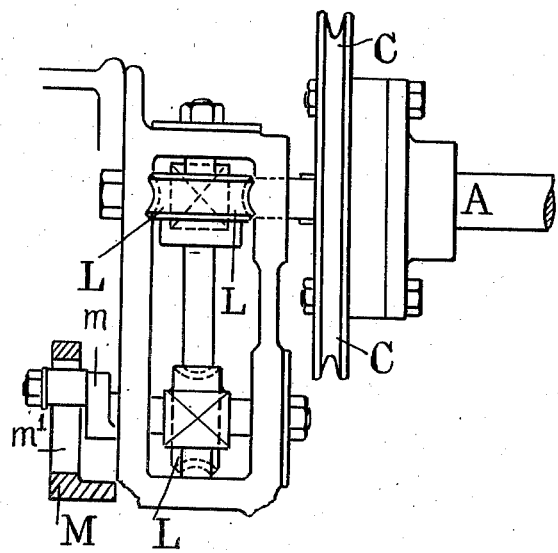

The driving shaft A which may be the end of a motor shaft (or it may be otherwise driven) is suitably mounted in the machine and the driven shaft B is mounted at approximately right angles thereto. A grooved rope driving pulley C is fitted fast on the driving shaft A and an idle grooved rope pulley D is mounted loose on an adjustable stud $A^1$ whose axis is parallel to the axis of the driving shaft A. The stud $A^1$ is capable of movement to regulate and adjust the tension of the endless driving rope K which passes round the pulleys.

Two pairs of fast and loose grooved rope pulleys E—F and G—H are fitted on the driven shaft B, E and G being the fast pulleys and F and H the loose pulleys, from which a driving rope K may be readily shifted from the fast pulleys E and G to the loose pulleys F and H and vice versa. The grooved fast and loose pulleys are preferably such as described in the specification of concurrent application Serial No. 241,167 made with grooves to facilitate the shifting of the rope from one to the other. The endless driving rope K passes around the four sets of pulleys being so disposed in relation to the fast and loose pulleys on the driven shaft B that it is around the fast pulley of one pair and the loose pulley of the other pair. The two pairs of fast and loose grooved pulleys on the driven shaft are fitted in such relation to one another that the lateral movement of the rope in either direction moves it from one fast pulley on to the adjacent loose pulley and from one loose pulley on to the adjacent fast pulley.

The driving shaft A is continuously driven in one direction by a motor coupled to it or by a pulley or gearing from any source of power and the rope K is also continuously driven in one direction. The rope K passes from the driving pulley C fast on the driving shaft A round one pair of pulleys on the driven shaft B back over the loose or idle pulley D, thence round the second pair of pulleys on the driven shaft B and back over the fast driving pulley C thus driving the fast pulley of one pair of pulley (say E) on the driven shaft B in one direction and the loose pulley (say H) of the other pair of pulleys on the driven shaft in the reverse direction thus by moving the rope K alternately from one fast pulley on to the other fast pulley a reversal of drive of the driven shaft is obtained.

The rope shifting mechanism comprises two reciprocating bars M and N the bar M being positively moved to and fro by a rotary crank $m$ engaging in a slot $m^1$ therein and the bar N by a detachable weighted pawl $n$ pivoted on the bar M engaging a notch $n^1$ on the bar N. The rotary crank $m$ is driven to rotate slowly by a worm (L) or other speed reducing gear from the driving shaft. The bar M is carried in bearings at its ends through which it slides and is formed with a lug or projection with a slot or aperture $m^1$ in which the crank $m$ rotates to give it its reciprocating movement. The bar N is carried in slides $p$ in a swivelling bracket P mounted on the bearings of the driven shaft to swing or swivel thereon the bar N being free to slide to and fro longitudinally. The swivelling bracket P when swung backwards releases the weighted pawl $n$ from the notch $n^1$ in the bar N and stops it from reciprocating, the ends of the bar engaging inclined brackets which hold it in a central or other predetermined position. The second bar N carries two forks R and S for the rope K by which the rope is simultaneously changed about the two pairs of fast and loose pulleys E—F and G—H on one pair from fast pulley to loose pulley and on the other pair from loose pulley to fast pulley thereby changing the direction of rotation of the driven shaft B.

The swivelling bracket P carrying the bar N is connected by a link $q$ with an operating handle Q by which it can be swung backwards. When the swivelling bracket P and second bar N are swung backward the rope remains on the fast pulley E running in the forward direction. The operating handle Q is connected to the link $q$ by a spring $q^1$ and lever $q^2$ In order to ensure the quick transfer of the rope K from one pulley to the other a spring toggle mechanism is attached comprising a pair of toggle levers T one lever fitted with a block or sleeve $t$ sliding on the other against the pressure of a spring. Both the toggle levers are pivoted at their ends and a lug or tail projection $t^1$ on one is engaged by a notch on the reciprocating bar M which moves the lever to and fro and as the toggles reach the dead centre they complete each stroke of the bar. The upper pivot $t^2$ of the toggle is mounted on movable block and adjustable by a micrometer screw.

The gear is particularly applicable for the drive of washing, dry cleaning and similar machines in which a chamber or cylinder is rotated for a predetermined number of revolutions in one direction and then in the opposite direction, the alteration in direction being effected a number of times before the machine is stopped.

What I claim as my invention and desire to protect by Letters Patent is:

1. Rope reversing gearing comprising in combination a driving shaft, a driven shaft mounted in suitable bearings disposed at right angles to the driving shaft, a grooved rope driving pulley fast on the driving shaft, a loose idle grooved rope pulley in a plane parallel to the driving pulley, a pair of fast and loose grooved rope driven pulleys mounted adjacent to each other on the driven shaft in a plane to receive a rope running from the grooved rope driving pulley and thence to the grooved idle pulley, a second pair of fast and loose grooved rope driven pulleys adjacent to each other on the driven shaft in a plane to receive a rope from the grooved rope idle pulley and thence back to the grooved rope driving pulley, an endless driving rope passed round the said pulleys adapted to be continuously driven in one direction, a reciprocating bar carrying forks to engage the endless driving rope to shift it periodically alternately from side to side from the fast grooved pulley to the loose grooved pulley of one pair of driven pulleys and simultaneously from the loose grooved pulley to the fast grooved pulley of the other pair of driven pulleys and means for reciprocating the bar connected to the rotary driving shaft thereby at each movement reversing the direction of rotation of the driven shaft, a swivelling bracket mounted on the driven shaft between the two pairs of grooved rope pulleys, slides on the swivelling bracket in which moves the reciprocating bar carrying the forks for shifting the rope from fast to loose pulley and from loose to fast pulley and a link and handle connected therewith by which the bracket is swivelled.

2. Rope reversing gearing comprising in combination a driving shaft, a driven shaft mounted in suitable bearings disposed at right angles to the driving shaft, a grooved rope driving pulley fast on the driving shaft, a loose idle grooved rope pulley in a plane parallel to the driving pulley, a pair of fast and loose grooved rope driven pulleys mounted adjacent to each other on the driven shaft in a plane to receive a rope running from the grooved rope driving pulley and thence to the grooved idle pulley, a second pair of fast and loose grooved rope driven pulleys adjacent to each other on the driven shaft in a plane to receive a rope from the grooved rope idle pulley and thence back to the grooved rope driving pulley an endless driving rope passed round the said pulleys adapted to be continuously driven in one direction and mechanism for shifting the rope comprising a reciprocating bar mounted in fixed bearings, a rotary crank engaging the reciprocating bar and by which it is operated, a speed reducing gear by which the crank is driven connected with the driving shaft, a second reciprocating bar adapted to move to and fro with the first reciprocating bar, a weighted pawl pivoted on the first reciprocating bar to engage the second bar, a swivelling bracket provided with slides in which the second reciprocating bar moves to and fro, forks affixed to the second reciprocating bar for shifting the rope from fast to loose pulley and from loose to fast pulley and means to rock the swivelling bracket to release the weighted pawl and disconnect the two bars to arrest the motion of the second bar.

TERENCE H. O'BRIEN.